UNITED STATES PATENT OFFICE.

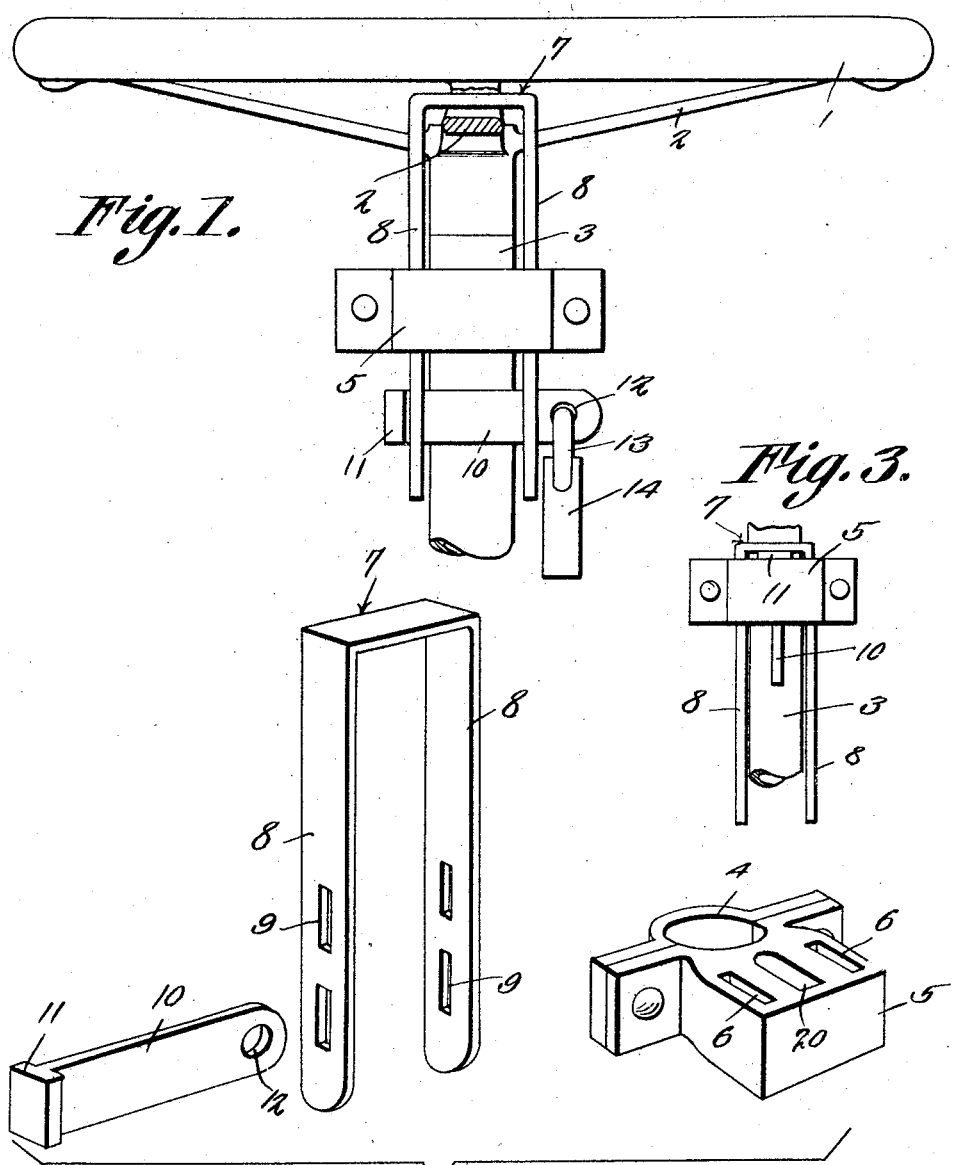

JOHN A. BRADER, OF ALLENTOWN, PENNSYLVANIA.

STEERING-WHEEL LOCK.

1,364,068.   Specification of Letters Patent.   Patented Jan. 4, 1921.

Application filed August 5, 1919. Serial No. 315,432.

*To all whom it may concern:*

Be it known that I, JOHN A. BRADER, a citizen of the United States, residing at Allentown, in the county of Lehigh and State of Pennsylvania, have invented a new and useful Steering-Wheel Lock, of which the following is a specification.

This invention relates to a device for locking the steering wheel of a motor propelled vehicle, and has for its object the provision of a simple efficient device that may be inexpensively produced, easily attached and that will effectually prevent theft or unauthorized use of the vehicle to which it is attached.

With these and other objects in view, which will appear as the description proceeds, the invention resides in the novel combination and arrangement of parts to be more fully pointed out and claimed in the annexed specification.

It is within the province of the present invention to improve generally and to enhance the utility of devices of that type to which the present invention appertains, it being understood that slight changes may be made therein, without departing from the spirit or sacrificing any of the advantages of the invention.

In the drawing:—

Figure 1 is a view in elevation of a steering wheel and steering column with the invention attached thereto.

Fig. 2 is a view in perspective of the several parts separated.

Fig. 3 is a view showing the device assembled when not in use.

Referring to the drawings by characters of reference, there is shown at 1 the steering wheel of an automobile having spokes 2. The numeral 3 designates the steering column of the vehicle.

Secured to the column 3 in any suitable manner, preferably by means of a clip 4 is a block 5, having openings 6 extending vertically therethrough.

An inverted U-shaped clip member 7 is adapted to be placed over one of the spokes 2 of the steering wheel and the legs 8 of the member 7 enter the openings 6 in the block.

Transverse slots 9 are formed in the legs of the clip 7 and a bar or key 10 having a head 11 is inserted in the openings 9 across the underside of the block 5, an opening 12 in the end of the bar 10 receives the shackle 13 of an ordinary padlock 14, and this prevents withdrawal of the bar.

The relatively deep block 5 securedly fixed to the steering post prevents sidewise movement of the clip 7 and consequently, limits the movement of the spoke in the clip 7 to such a small degree as to render the wheel useless for steering.

The clip 7 is provided with a plurality of slots 9, so that the device may be attached to wheels having longer or shorter hubs without any further adjustment being necessary.

An opening 20 in the block is located between the openings 6, and is adapted to receive the shank of the key 10, and provides convenient assembly of the device when not in use, the shank of the key passing through the opening 20, the head 11 resting on the block 5, and the clip 7 engaging the head 11 to hold the key in place.

Having thus described the invention, what is claimed is:—

In a device of the class described, a block secured to the steering post of a motor vehicle said block having an extension, provided with a plurality of openings, a U-shaped clip for engaging one of the spokes of the steering wheel, the legs of the clip being adapted to project through certain of the openings in the block, the legs of the clip having alined transversely extended openings, a key adapted to seat in the openings in the clip and means for securing the key to the clip, one of the openings in the extension being adapted to receive the key when not in use, the key being overridden by the clip and retained by the clip, against misplacement when not in use.

In testimony that I claim the foregoing as my own, I have hereto affixed my signature in the presence of two witnesses.

JOHN A. BRADER.

Witnesses:
 HARVEY A. MOYER,
 THOMAS J. HEAVER.